United States Patent [19]

Yoshino

[11] Patent Number: 4,843,414
[45] Date of Patent: Jun. 27, 1989

[54] IMAGE RECORDING METHOD AND APPARATUS
[75] Inventor: Shigeru Yoshino, Kanagawa, Japan
[73] Assignee: Fuji Photo Film Co., Ltd., Kanagawa, Japan
[21] Appl. No.: 178,945
[22] Filed: Apr. 7, 1988
[30] Foreign Application Priority Data
  Apr. 7, 1987 [JP] Japan ................... 62-83770
[51] Int. Cl.⁴ .............................. G03B 7/24
[52] U.S. Cl. .................................... 354/21
[58] Field of Search ......................... 354/21
[56] References Cited
  U.S. PATENT DOCUMENTS
  4,736,215  4/1988  Hudspeth et al. ................. 354/21
  4,783,672 11/1988 Wirtz et al. ..................... 354/21

Primary Examiner—Michael L. Gellner
Attorney, Agent, or Firm—Sughrue, Mion, Zinn, Macpeak & Seas

[57] ABSTRACT

In an image recording method and apparatus, a magazine holding a photo-sensitive material has a data storage means, such as a magnetic tape, in which data concerning the photo-sensitive material has been recorded, and when the magazine is loaded in an image recording apparatus, the data is read out by a data detecting means such as a magnetic head provided in the image recording apparatus so that the image recording operation is carried out and controlled according to the data thus read out and the amount of usable photo-sensitive material remaining may be monitored.

13 Claims, 1 Drawing Sheet

IMAGE RECORDING METHOD AND APPARATUS

BACKGROUND OF THE INVENTION

This invention relates to an image recording method and apparatus in which a magazine holding a photo-sensitive material is loaded in an image recording apparatus and a latent image is formed on the photo-sensitive material by optical exposure to achieve an image recording operation.

In one example of a conventional image recording apparatus using a photo-sensitive material a belt-shaped photo-sensitive material wound in the form of a roll is held in a magazine, and the magazine is loaded in the apparatus. An image recording operation with the conventional apparatus is carried out as follows: A predetermined length of the photo-sensitive material is pulled out of the magazine and a latent image is formed on that length of photo-sensitive material by optical exposure. The exposed photo-sensitive material is then subjected to developing, and the developed image is transferred onto an image receiving material when necessary.

The above-described photo-sensitive material maybe wound for instance on a cylindrical core. In general, the photo-sensitive material is in the form of a thin film. Therefore, a considerable length of the belt-shaped photo-sensitive material can be wound on the core, and the resultant roll of photo-sensitive material has a large diameter. The roll of photo-sensitive material is tightly wound on the core and as a result, the end portion of the photo-sensitive material which is in contact with the core is compressed by the layers of the photo-sensitive materials laid one on another. As a consequent, the step formed at the edge of the end portion of the photo-sensitive material damages the part of the photo-sensitive material which overlays the end portion. It goes without saying that an image formed on the photo-sensitive material thus damaged is unsatisfactory in quality. This difficulty may be eliminated by preventing the use of the photo-sensitive material in the magazine while a predetermined length of photo-sensitive material still remains in the magazine, so that the part thus damaged is not used. However, when a magazine holding a photo-sensitive material long enough for an image recording operation is loaded in the image recording apparatus, it is difficult to accurately detect the length of the remaining photo-sensitive material which is actually usable.

In the case of color photo-sensitive materials, even if different rolls of color photo-sensitive materials are of the same kind, they are slightly different in sensitivity and in coloring characteristic according to their lots in manufacture, and therefore they will not result in the same control balance, even if they are exposed under the same conditions. Accordingly, whenever a magazine is loaded in the image recording apparatus it is necessary to perform image recording control for color balance correction.

SUMMARY OF THE INVENTION

Accordingly, an object of the invention is to provide an image recording method and apparatus in which data about the photo-sensitive material held in a magazine, such as the length of the photo-sensitive material remaining in the magazine and the coloring characteristic of the color photo-sensitive material therein are detected to enable recording of images on the photo-sensitive material.

The foregoing object and other objects of the invention have been achieved by the provision of an image recording method and apparatus in which, according to the invention, a magazine holding a photo-sensitive material is provided with a data storage means. The data storage means stores data concerning the photo-sensitive material. A detecting means provided in the image recording apparatus reads the data from the data storage means and performs image recording control. Whenever the photo-sensitive material is subjected to optical exposure or when jamming occurs before the optical exposure, a recording means provided in the image recording apparatus records new data in the data storage means.

In the method and apparatus of the invention, when the magazine is loaded in the image recording apparatus the data bout the photo-sensitive material is detected by the detecting means, and the image recording operation is controlled according to the data thus detected, so that the recording is matched with the photo-sensitive material at all times.

For instance in the case where the data storage means of the magazine has stored therein the length of the photo-sensitive material, the effective length of the photo-sensitive material is read by the detecting means. This is effective especially when the magazine is reloaded in the image recording apparatus again.

In the case where the data in the data storage means of the magazine includes the sensitivity and coloring characteristic of the color photo-sensitive material, the image recording operation can be carried out with correct color balance separately according to the lots of the photo-sensitive materials used during manufacture.

In the method and apparatus of the invention, the data storage means of the magazine can be a magnetic medium, and the detecting means and the recording means of the image recording apparatus can be a magnetic head, thus facilitating detection and recording of data concerning the photo-sensitive material.

The photo-sensitive material used in the method and apparatus of the invention is not particularly limited, and it may be in the form of a roll or sheet.

One example of the photo-sensitive material used in the method of the invention has been disclosed for instance by Japanese Patent Application (OPI) No. 179836/1982 (the term "OPI" as used herein means an "unexamined published application"). In the photo-sensitive material microcapsules containing photo-sensitive compounds are pressurized to form visible images. Another example of the photo-sensitive material has been disclosed by Japanese Patent Application (OPI) No. 275742/1986. which is heated before pressurized. In addition a thermal diffusion transfer type photo-sensitive material disclosed by Japanese Patent Application No. 89376/1986 filed by the present applicant can be used in the method and apparatus of the invention.

The nature principle and utility of the invention will become more apparent from the following detailed description and the appended claims when read in conjunction with the accompanying drawing.

BRIEF DESCRIPTION OF THE DRAWING

In the accompanying drawing the single FIGURE is a perspective view showing a photo-sensitive material magazine used in an embodiment of the recording method and apparatus according to this invention which is loaded in an image recording apparatus.

DETAILED DESCRIPTION OF THE PREFERRED EMBODIMENT

Figure 1:
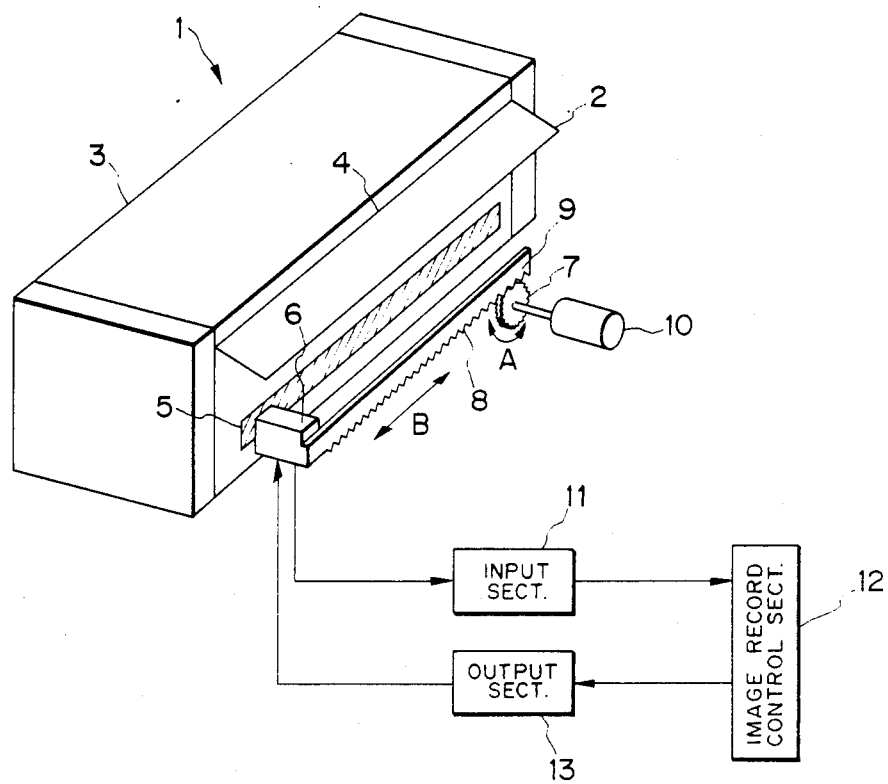

One preferred embodiment of this invention will be described with reference to the single FIGURE in the accompanying drawing.

In an image recording method and apparatus according to the invention a photo-sensitive material magazine 1 is loaded in an image recording apparatus as shown in FIG. 1.

In the photo-sensitive magazine 1, a photo-sensitive material 2 wound in the form of a roll is held in such a manner that it is shielded from exposure to external light. The photo-sensitive material 2 is pulled out of the magazine 1 as required through a light-shielding slit 4 formed in the barrel 3 of the magazine 1 so that it is subjected to optical exposure to form a latent image thereon. The photo-sensitive material 2 thus treated can then be cut to a predetermined length and delivered to the next station. A magnetic tape 5 is provided on the barrel 3 of the magazine 1. Data concerning the photo-sensitive material 2, such as the number of turns, the sensitivity and the coloring characteristic of the photo-sensitive material have been magnetically recorded on the magnetic tape 5.

On the other hand, the magazine loading section of the image recording apparatus (not shown) has a magnetic head 6 which is disposed near the magnetic tape 5 on the magazine 1, so that the head 6 can scan the magnetic tape 5. The magnetic head 6 is fixedly secured to a base member 9 with a gear 8. The gear 8 is engaged with a gear 7 fixedly mounted on the output shaft of an electric motor 10. Therefore, as the gear 7 is rotated in the direction of the arrow A by the motor 10, the magnetic head 6 scans the magnetic tape 5 in the direction of the arrow B. That is, the magnetic head 6 can read data off of the magnetic tape 5, and write data therein, while moving as described above.

The data of the photo-sensitive material read by the magnetic head 6 is applied through an input section 11 of the recording apparatus to an image recording control section 12. The control section 12 applies data through an output section 13 to the magnetic head 6 so that the data can be recorded onto the magnetic tape 5. The image recording control section 12 controls the operation of image recording means, such as an exposure unit and photo-sensitive material conveying unit, according to the data received through the input section 11. The operation of the magnetic head 6 is controlled so that, after the magazine 1 is loaded in the image recording apparatus, and the data on the photo-sensitive material is transferred from the magnetic tape 5 into the image recording control section 12 by the magnetic head 6, for every optical exposure or if jamming occurs prior to optical exposure, the data from the image recording control section 12 is written onto the magnetic tape 5.

It is assumed that the magnetic tape 5 already stores the number of turns of the photo-sensitive material. When, in this case, the magazine 1 is loaded in the image recording apparatus, the magnetic head 6 reads the number of turns from the magnetic tape 5, and the image recording control section 12 utilizes the number of turns thus read and the length of the photo-sensitive material 2 that has been pulled out for an image recording operation to determine the number of turns (or the length) of the photo-sensitive material 2 remaining in the magazine. When the length of the photo-sensitive material 2 remaining in the magazine 1 is determined to be too short for the image recording operation, the image recording control section 12 controls the operation of the photo-sensitive material feeding means so that the photo-sensitive material 2 may not be pulled out of the magazine.

At the end of an optical exposure or when an optical exposure is suspended for instance because of jamming, the difference between the length of the photo-sensitive material 2 stored on the magnetic tape and the length of the photo-sensitive material used; that is, the number of turns (length) of the photo-sensitive material 2 remaining in the magazine 1 is applied to the output section 13 by the image recording control section 12, and is recorded on the magnetic tape 5 by the magnetic head 6.

Thus, even if the optical exposure is suspended as described above the length of photo-sensitive material remaining in the magazine 1 loaded in the image recording apparatus can be accurately detected.

For instance in the case where the sensitivity and the coloring characteristic of a color photo-sensitive material 2 have been stored on the magnetic tape 5, this data is applied through the magnetic head 6 to the image recording control section 12 so that the operation of the exposure unit is controlled based on the data thus applied; that is the operation of the exposure unit is controlled based on the data thus applied: that is, the operation of the exposure unit is so controlled that the color photo-sensitive material 2 is subjected to optical exposure with an amount of exposure and an amount of filter correction which are suitable for the data thus applied.

Accordingly, even if color photo-sensitive materials 2 manufactured in lots are slightly different both in sensitivity and in coloring characteristic, the color photo-sensitive material 2 in the magazine 1 can be subjected to optical exposure with high accuracy.

In the above-described embodiment, the magnetic tape 5 stores the length (number of turns). sensitive and coloring characteristic of the photo-sensitive material: however, the invention is not limited thereto or thereby. That is, additional data concerning the photo-sensitive material can be recorded on the magnetic tape, and the image recording control can be carried out based on the data thus recorded.

The magnetic tape 5 may be provided on any part of the surface of the magazine 1, and its configuration and area (size) are not limited.

The magnetic head scanning means is not limited to the specific embodiment which has been described above. For instance, it may be such that the operation of loading or unloading the magazine 1 is utilized to read data from the magnetic tape or to write data therein.

Furthermore, the magnetic tape 5 may be replaced by an IC memory or IC card for electrically transmitting data between the magazine and the image recording apparatus.

WHAT IS CLAIMED IS:

1. An image recording method comprising the following steps:
    storing data relating to a photo-sensitive material held in a magazine, in a storage means on said magazine:
    reading said data from said storage means by a data detecting means provided in an image recording apparatus;

performing image recording control--based on said data read from said storage means on said magazine by said detecting means: and recording new data in said data storage means by a data recording means provided in said image recording apparatus whenever at least one of the following occurs: said photo-sensitive material is subjected to optical exposure and when jamming of said photo-sensitive material occurs before said optical exposure.

2. An image recording method as claimed in claim 1, wherein said storage means stores the number of turns of said photo-sensitive material in said magazine.

3. An image recording method as claimed in claim 1, wherein said storage means stores the sensitivity and coloring characteristic of said photo-sensitive material in said magazine.

4. An image recording method as claimed in claim 1, wherein said storage means stores the number of turns, the sensitivity and coloring characteristic of said photo-sensitive material in said magazine.

5. An image recording method as claimed in claim 1, wherein said storing is done magnetically, said storage means being a magnetic medium, while said data detecting means and said data recording means are a magnetic head.

6. An image recording method as claimed in claim 1, wherein said storing is done electronically, and said storage means is one of either an integrated circuit memory and integrated circuit card.

7. An image recording apparatus comprising
a magazine loading section, photo-sensitive material being held in said magazine, said magazine having a data storage means:
image recording means:
means for drawing said photo-sensitive material from said magazine:
data detecting means for reading data from said data storage means on said magazine;
data recording means for recording data into said data storage means on said magazine, whenever at least one of the following occurs said photo-sensitive material is subjected to image recording by said image recording means and said photo-sensitive material jams prior to image recording.

8. An image recording apparatus as claimed in claim 7, wherein said image recording means is an optical exposure means.

9. An image recording apparatus as claimed in claim 7, wherein said photosensitive material in said magazine is rolled on a spindle.

10. An image recording apparatus as claimed in claim 9, wherein the data stored in said data storage means includes the number of turns of said photo-sensitive material on said spindle in said magazine.

11. An image recording apparatus as claimed in claim 7, wherein the data stored in said data storage means includes the sensitivity and coloring characteristic of said photo-sensitive material in said magazine.

12. An image recording apparatus as claimed in claim 7, wherein said data storage means is a magnetic medium and said data detecting means and said data recording means are a magnetic head.

13. An image recording apparatus as claimed in claim 7, wherein said data storage means is one of either an integrated circuit memory and integrated circuit card.

* * * * *